(12) United States Patent
Fukami

(10) Patent No.: US 10,443,563 B2
(45) Date of Patent: Oct. 15, 2019

(54) VORTEX GENERATOR, WIND TURBINE BLADE, AND WIND TURBINE POWER GENERATING APPARATUS

(71) Applicant: MITSUBISHI HEAVY INDUSTRIES, LTD., Tokyo (JP)

(72) Inventor: Koji Fukami, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 512 days.

(21) Appl. No.: 15/195,221

(22) Filed: Jun. 28, 2016

(65) Prior Publication Data

US 2017/0138339 A1    May 18, 2017

(30) Foreign Application Priority Data

Nov. 13, 2015    (JP) .................................. 2015-222758

(51) Int. Cl.
*F03D 1/06* (2006.01)
*F03D 9/25* (2016.01)

(52) U.S. Cl.
CPC .......... *F03D 1/0675* (2013.01); *F03D 1/0633* (2013.01); *F03D 9/25* (2016.05); *F05B 2240/122* (2013.01); *Y02E 10/721* (2013.01)

(58) Field of Classification Search
CPC . F05B 2240/122; F03D 1/0675; F03D 1/0633
See application file for complete search history.

(56) References Cited

U.S. PATENT DOCUMENTS

| 5,058,837 A | 10/1991 | Wheeler |
| 6,837,465 B2 * | 1/2005 | Lisy ....................... B64C 23/06 |
| | | 244/204 |
| 7,914,259 B2 | 3/2011 | Godsk |
| 8,162,590 B2 | 4/2012 | Haag |
| 8,419,373 B1 | 4/2013 | Fukami |

(Continued)

FOREIGN PATENT DOCUMENTS

| DE | 102013201871 A1 | 8/2014 |
| DE | 102013210733 A1 | 12/2014 |

(Continued)

OTHER PUBLICATIONS

Hansen, M. O. L. et al., "Aerodynamically shaped vortex generators," Wind Energy, 2015, John Wiley & Sons, Ltd.

(Continued)

*Primary Examiner* — Carlos A Rivera
*Assistant Examiner* — Danielle M. Christensen
(74) *Attorney, Agent, or Firm* — Manabu Kanesaka; Benjamin Hauptman; Kenneth Berner

(57) ABSTRACT

A vortex generator for a wind turbine blade includes a fin protruding from a surface of the wind turbine blade, being oriented so that a fin chord of the fin is oblique to an in-flow direction of wind which flows toward the wind turbine blade, having a suction surface which faces toward downstream with respect to the in-flow direction of the wind and which has a curved convex shape, and having a maximum fin blade-thickness ratio tmax/C which satisfies an expression of 0.10≤tmax/C≤0.12 in a height range of at least a part of the fin, where the maximum fin blade-thickness ratio tmax/C is a ratio of a maximum fin blade thickness tmax to a fin chord length C.

14 Claims, 8 Drawing Sheets

(56) References Cited

U.S. PATENT DOCUMENTS

| | | |
|---|---|---|
| 8,678,746 B2 | 3/2014 | Haag |
| 9,051,919 B2 | 6/2015 | Jensen et al. |
| 9,133,816 B2 | 9/2015 | Jensen et al. |
| 9,273,667 B2 | 3/2016 | Enevoldsen et al. |
| 9,303,621 B2 | 4/2016 | Fuglsang et al. |
| 9,562,513 B2 | 2/2017 | Tobin et al. |
| 9,759,186 B2 | 9/2017 | Grabau et al. |
| 9,869,297 B2 | 1/2018 | Tobin et al. |
| 2008/0317600 A1 | 12/2008 | Enevoldsen et al. |
| 2011/0142673 A1 | 6/2011 | Fang et al. |
| 2012/0100005 A1 | 4/2012 | Oestergaard et al. |
| 2012/0201689 A1 | 8/2012 | Fuglsang et al. |
| 2012/0257977 A1 | 10/2012 | Jensen et al. |
| 2012/0282105 A1 | 11/2012 | Grife et al. |
| 2013/0129520 A1 | 5/2013 | Enevoldsen et al. |
| 2014/0140856 A1 | 5/2014 | Madsen et al. |
| 2014/0241880 A1 | 8/2014 | Madsen |
| 2014/0328687 A1 | 11/2014 | Tobin et al. |
| 2014/0328692 A1 | 11/2014 | Riddell et al. |
| 2014/0328693 A1 | 11/2014 | Wilson et al. |
| 2015/0010407 A1 | 1/2015 | Zamora Rodriguez et al. |
| 2015/0322791 A1 | 11/2015 | Flach |
| 2016/0017864 A1 | 1/2016 | Grabau et al. |
| 2016/0215758 A1 | 7/2016 | Corten |
| 2016/0252073 A1 | 9/2016 | Fuglsang et al. |
| 2016/0327021 A1 | 11/2016 | Tobin et al. |

FOREIGN PATENT DOCUMENTS

| | | | |
|---|---|---|---|
| EP | 1944505 A1 | 7/2008 | |
| EP | 2031241 A1 | 3/2009 | |
| EP | 2444658 A1 | 4/2012 | |
| EP | 2466122 A2 | 6/2012 | |
| EP | 2484895 A1 | 8/2012 | |
| EP | 2484896 A1 | 8/2012 | |
| EP | 2484897 A1 | 8/2012 | |
| EP | 2484898 A1 | 8/2012 | |
| EP | 2548800 A1 | 1/2013 | |
| EP | 2597300 A1 | 5/2013 | |
| EP | 2799709 A1 | 11/2014 | |
| EP | 2799710 A1 | 11/2014 | |
| EP | 2942521 A1 | 11/2015 | |
| WO | 2007/140771 A1 | 12/2007 | |
| WO | 2013/014015 A2 | 1/2013 | |
| WO | WO-2014198353 A1 * | 12/2014 | ........... F03D 1/0675 |
| WO | 2015/030573 A1 | 3/2015 | |
| WO | 2015/053768 A1 | 4/2015 | |

OTHER PUBLICATIONS

Europe Patent Office, "Search Report for European Patent Application No. 16173929.7," dated Apr. 4, 2017.

Europe Patent Office, "Search Report for European Patent Application No. 16173927.1," dated Mar. 17, 2017.

Japan Patent Office, "Office Action for Japanese Patent Application No. 2015-222758," dated Feb. 7, 2017.

Japan Patent Office, "Office Action for Japanese Patent Application No. 2015-221838," dated Feb. 7, 2017.

U.S.P.T.O., "Office Action for U.S. Appl. No. 15/217,949," dated Sep. 20, 2018.

* cited by examiner

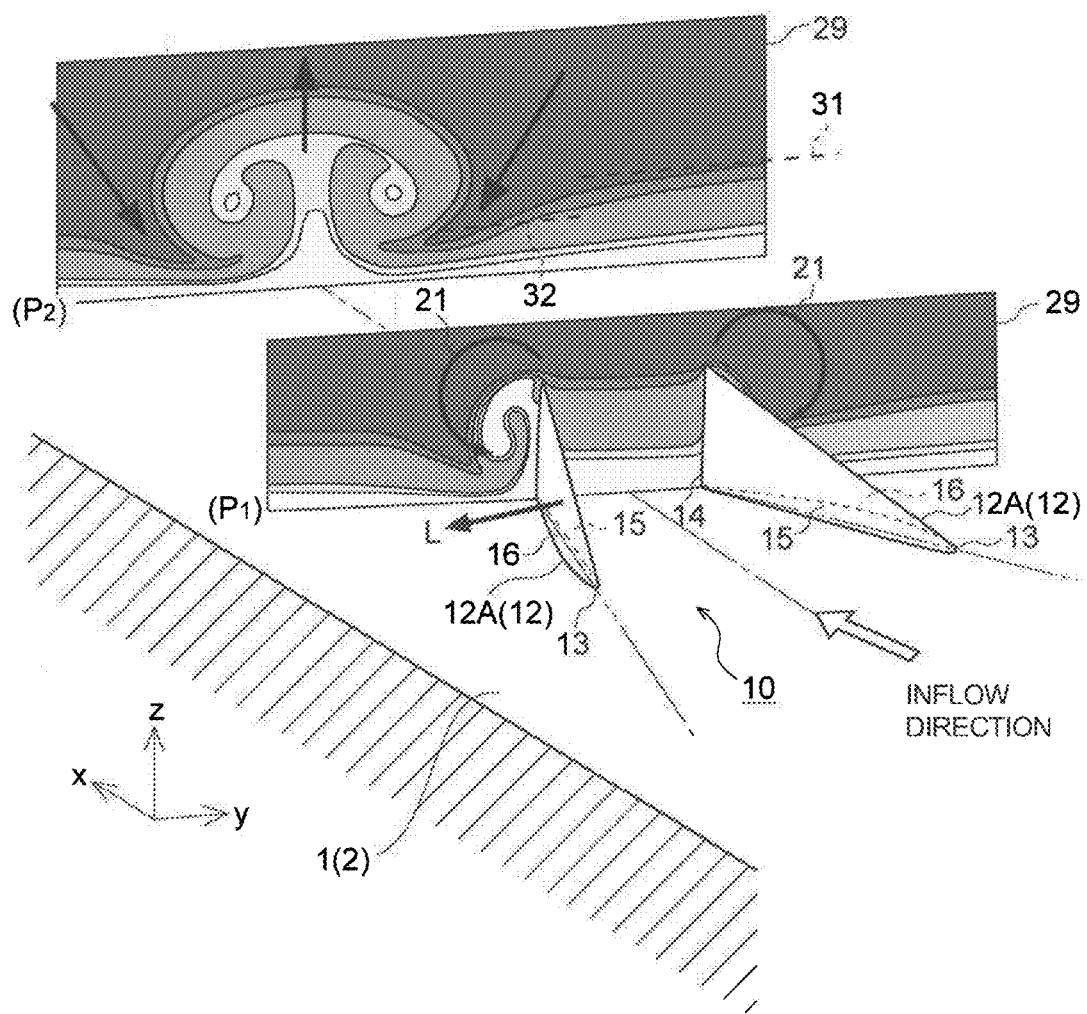

VORTEX GENERATOR, WIND TURBINE BLADE, AND WIND TURBINE POWER GENERATING APPARATUS

RELATED APPLICATIONS

The present application is based on, and claims priority from, Japanese Application No. JP2015-222758 filed Nov. 13, 2015, the disclosure of which is hereby incorporated by reference herein in its entirety.

TECHNICAL FIELD

The present disclosure relates to a vortex generator, a wind turbine blade, and a wind turbine power generating apparatus.

BACKGROUND ART

Approaches to improve aerodynamic performance of a wind turbine blade have been sought for some time in context of improvement of operation efficiency of a wind turbine. In one of the approaches, a vortex generator is disposed on a surface of a wind turbine blade to suppress separation of a flow along the surface of the wind turbine blade.

Patent Documents 1 to 10 disclose a vortex generator having a platform portion to be mounted to a surface of a wind turbine blade, and a fin disposed upright on the platform portion.

CITATION LIST

Patent Literature

Patent Document 1: US Patent Application Publication No. 2014/0140856
Patent Document 2: EP2548800A
Patent Document 3: EP2799709A
Patent Document 4: WO2007/140771A
Patent Document 5: EP2484895A
Patent Document 6: EP2484896A
Patent Document 7: EP2484897A
Patent Document 8: EP2484898A
Patent Document 9: WO2015/030573A
Patent Document 10: EP2597300A

SUMMARY

While the vortex generators disclosed in Patent Documents 1 to 10 may be capable of achieving the originally intended goal set for a vortex generator to suppress separation of a flow along a surface of a wind turbine blade, installation of the vortex generators may bring about drag penalty.

An object of at least some embodiments of the present invention is to provide a vortex generator capable of reducing drag penalty due to installation of the vortex generator while suppressing separation of a flow along a surface of a wind turbine blade, as well as a wind turbine blade and a wind turbine power generating apparatus having the vortex generator.

(1) A vortex generator for a wind turbine blade according to some embodiments of the present invention comprises a fin protruding from a surface of the wind turbine blade, being oriented so that a fin chord of the fin is oblique to an in-flow direction of wind which flows toward the wind turbine blade, having a suction surface which faces toward downstream with respect to the in-flow direction of the wind and which has a curved convex shape, and having a maximum fin blade-thickness ratio tmax/C which satisfies an expression of $0.10 \leq tmax/C \leq 0.12$ in a height range of at least a part of the fin, where the maximum fin blade-thickness ratio tmax/C is a ratio of a maximum fin blade thickness tmax to a fin chord length C.

In the present specification, "in-flow direction of wind" refers to a direction of a flow along a surface of the wind turbine blade at a mounting position of the vortex generator. As an "in-flow direction of wind", a chordwise-direction of the wind turbine blade at a mounting position of the vortex generator may be used approximately.

A vortex generator produces a longitudinal vortex with a lift generated by a fin to promote momentum exchange between inside and outside a boundary layer at a downstream side of the vortex generator and reduce the thickness of the boundary layer, thereby suppressing separation at a trailing edge of a wind turbine blade. However, depending on the shape of the fin of the vortex generator, separation at the side of a suction surface of the fin may bring about generation of a streamwise vortex and this streamwise vortex may be cause an increase of drag. Accordingly, the shape of the fin of the vortex generator should be designed taking account of not only the effect to suppress separation at the trailing edge of the wind turbine blade but also the demerit (drag penalty) of an increase of a drag due to provision of the vortex generator.

In this regard, the above configuration (1) is based on a result of numerical calculation conducted by the present inventors to study an influence of a fin shape of the vortex generator on a lift coefficient and a lift-drag ratio of the fin, and the fin of the vortex generator has an airfoil such that the maximum fin blade-thickness ratio tmax/C satisfies an expression of $0.10 \leq tmax/C \leq 0.12$, in the height range of at least a part of the fin.

While a typical environment of usage of the vortex generator for a wind turbine is viscosity-dominated (approximately, $Re = 10^3$ to $10^4$), with the maximum fin blade-thickness ratio tmax/C set to be from 0.10 to 0.12, it is possible to suppress generation of the streamwise vortex due to separation at the suction surface of the fin, and to improve a lift coefficient and a lift-drag ratio of the fin.

More specifically, if the maximum fin blade-thickness ratio tmax/C is larger than 0.12, a lift of the fin may be maintained but a drag starts to increase, which leads to a decrease in a lift-drag ratio of the fin. On the other hand, if the maximum fin blade-thickness ratio tmax/C is smaller than 0.10, separation may be generated from the vicinity of the leading edge of the fin, which leads to a failure in maintaining a lift. Accordingly, a lift-drag ratio of the fin decreases. Therefore, with the maximum fin blade-thickness ratio tmax/C set to be from 0.10 to 0.12, it is possible to improve a lift coefficient and a lift-drag ratio of the fin.

(2) In some embodiments, in the above configuration (1), the maximum fin blade-thickness ratio tmax/C satisfies an expression of $0.10 \leq tmax/C \leq 0.11$ in a height range of at least a part of the fin.

With the above configuration (2), it is possible to achieve excellent lift coefficient and lift-drag ratio for the fin, and to balance suppression of separation at the trailing edge of the wind turbine blade and reduction of drag penalty effectively.

(3) In some embodiments, in the above configuration (1) or (2), the maximum fin blade-thickness ratio tmax/C satisfies an expression of $0.10 \leq tmax/C \leq 0.12$ in a height range of the fin represented by an expression of $0.5L \leq h \leq 0.85L$, where L is a fin entire length from a root to a top portion of the fin.

Further, in an embodiment, the maximum fin blade-thickness ratio tmax/C satisfies an expression of $0.10 \leq tmax/C \leq 0.12$ in a height range of the fin represented by an expression of $0.2L \leq h \leq 0.85L$.

With regard to the fin of the vortex generator, assuming that a fin height is zero at the root of the fin, a fluid velocity at a fin height of 0.5L corresponds to approximately 90% of the flow velocity of a main stream, and aerodynamic performance of the entire fin is greatly affected by a fin shape in a range of the fin height from 0.5L toward the top portion of the fin (a range represented by an expression of $0.5L \leq h$). It should be noted that, however, in a region in the vicinity of the top portion of the fin (a region represented by an expression of $h>0.85L$), importance of aerodynamic property is relatively small due to an influence of vortices generated at the top portion of the fin. Further, from a structural point of view, in the above region in the vicinity of the top portion of the fin, the maximum fin blade-thickness ratio is desired to be greater to ensure a certain dimension of the maximum fin blade thickness tmax. Thus, as in the above configuration (3), with the maximum fin blade-thickness ratio tmax/C set within the above numerical range in a height range of from 0.5L to 0.85L, it is possible to improve aerodynamic performance of the fin effectively while ensuring the strength of the fin.

(4) In some embodiments, in any one of the configurations (1) to (3), the fin has a thickness which reaches the maximum fin blade thickness tmax at a chordwise-directional position which is closer to a leading edge than a middle point of the fin chord is.

(5) In some embodiments, in the above configuration (4), a chordwise-directional position x at which the blade thickness of the fin reaches the maximum fin blade thickness tmax satisfies an expression of $0.3C \leq x \leq 0.4C$.

(6) In some embodiments, in the above configuration (5), the chordwise-directional position x at which the blade thickness of the fin reaches the maximum fin blade thickness tmax satisfies an expression of $0.31C \leq x \leq 0.35C$.

With the above configurations (4) to (6), it is possible to achieve excellent lift coefficient and lift-drag ratio for the fin, and to balance suppression of separation at the trailing edge of the wind turbine blade and reduction of drag penalty effectively.

(7) In some embodiments, in any one of the above configurations (1) to (6), the fin includes, in a side view, a first edge forming a connection part at which the fin connects to the surface of the wind turbine blade, a second edge intersecting with the first edge and being disposed on an upstream side with respect to the in-flow direction of the wind to form an upstream end portion of the fin, and a third edge intersecting with the first edge and being disposed on a downstream side with respect to the in-flow direction of the wind to form a downstream end portion of the fin.

It should be noted that the fin may have any polygonal shape in a side view, including a triangle formed by the first to third edges having a linear shape, and a quadrilateral having the fourth edge, which has a linear shape, connecting the second edge and the third edge, besides the first to third edges having a linear shape. Alternatively, a part of edges constituting a side-view shape of the fin, which are three or more edges including the first to third edges, may have a curve shape instead of a linear shape.

(8) In some embodiments, in the above configuration (7), the second edge of the fin is oblique to a fin height direction so as to get closer to a downstream side toward a top portion of the fin.

In this case, the second edge may be longer than the third edge.

With the above configuration (8), with the second edge (an edge forming the leading edge of the fin) disposed oblique to the fin height direction so as to get closer to the downstream side toward the top portion of the fin, it is possible to generate the vortex for promoting momentum exchange between inside and outside of the boundary layer at the downstream side of the fin.

(9) In some embodiments, in the above configuration (7) or (8), the fin further includes a fourth edge having a linear shape or a curve shape and forming a distal end of the fin with respect to the fin height direction, in a side view.

As described above, a region in the vicinity of the top portion of the fin has a relatively small importance with regard to aerodynamic property due to an influence of a vortex generated at the top portion of the fin. Thus, with the above configuration (9), the top portion of the fin, which has less influence on aerodynamic performance of the entire fin, is cut off to form the fourth edge, and thereby it is possible to enhance safety of workers who handle the vortex generator and to reduce induced drag that may be generated at the fin.

(10) In some embodiments, in any one of the above configurations (7) to (9), the first edge and the third edge form an angle of 90 degrees or less.

With the above configuration (10), after the fin having an airfoil is molded, the fin can be readily removed out of a mold by moving the fin relative to the mold in a direction oriented from the top portion of the fin toward the root.

(11) In some embodiments, in any one of the above configurations (1) to (10), the fin chord of the fin has a length which decreases from a root to a top portion of the fin.

With the above configuration (11), it is possible to reduce an area of the fin in a side view to reduce drag generated at the fin.

(12) In some embodiments, in any one of the above configurations (1) to (11), the fin has a shape such that a line connecting positions at which the thickness of the fin reaches the maximum fin blade thickness tmax is oblique to the fin height direction so as to extend toward the same side as that of a reference line connecting middle points of the fin chord length, in a height range of at least a part of the fin.

With the above configuration (12), even if the second edge or the third edge is oblique with respect to the fin height direction, it is possible to achieve an airfoil that improves a lift coefficient and a lift-drag ratio of the fin in a broad range in the fin height direction. Thus, it is possible to reduce drag penalty due to provision of the vortex generator while suppressing separation of a flow along a surface of the wind turbine blade.

(13) In some embodiments, in any one of the above configurations (1) to (12), the vortex generator is configured to be disposed on a suction surface of the wind turbine blade and within a turbulent flow region of a wind flow along the suction surface.

Separation of a flow at the suction surface of the wind turbine blade takes place due to a boundary layer becoming gradually thicker from a streamline flow region in the vicinity of the leading edge toward a turbulent flow region downstream thereof, and the flow being separated before arriving at the trailing edge.

In this regard, with the above configuration (13), the vortex generator is disposed within a turbulent flow region of a wind flow along the suction surface, and thereby it is possible to suppress separation of a flow from the suction surface.

(14) A wind turbine blade according to at least some embodiments of the present invention comprises: a blade body; and the vortex generator according to any one of the above (1) to (13), mounted to a surface of the blade body.

With the above configuration (14), as described in the above (1), the fin of the vortex generator has an airfoil such that the maximum fin blade-thickness ratio tmax/C satisfies an expression of 0.10≤tmax/C≤0.12 in a height range of at least a part of the fin, and thereby it is possible to reduce drag penalty due to provision of the vortex generator while suppressing separation of a flow along the surface of the wind turbine blade.

(15) A wind turbine power generating apparatus according to at least some embodiments of the present invention comprises the wind turbine blade according to the above (14).

With the above configuration (15), the wind turbine power generating apparatus is equipped with the wind turbine blade of the above configuration (14), and thereby it is possible to reduce drag penalty due to provision of the vortex generator while suppressing separation of a flow along a surface of the wind turbine blade.

According to at least one embodiment of the present invention, it is possible to reduce drag penalty due to provision of the vortex generator while suppressing separation of a flow along a surface of the wind turbine blade.

BRIEF DESCRIPTION OF DRAWINGS

FIG. 4B is a velocity distribution diagram showing a result of fluid analysis around a vortex generator according to an embodiment.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

Figure 1:
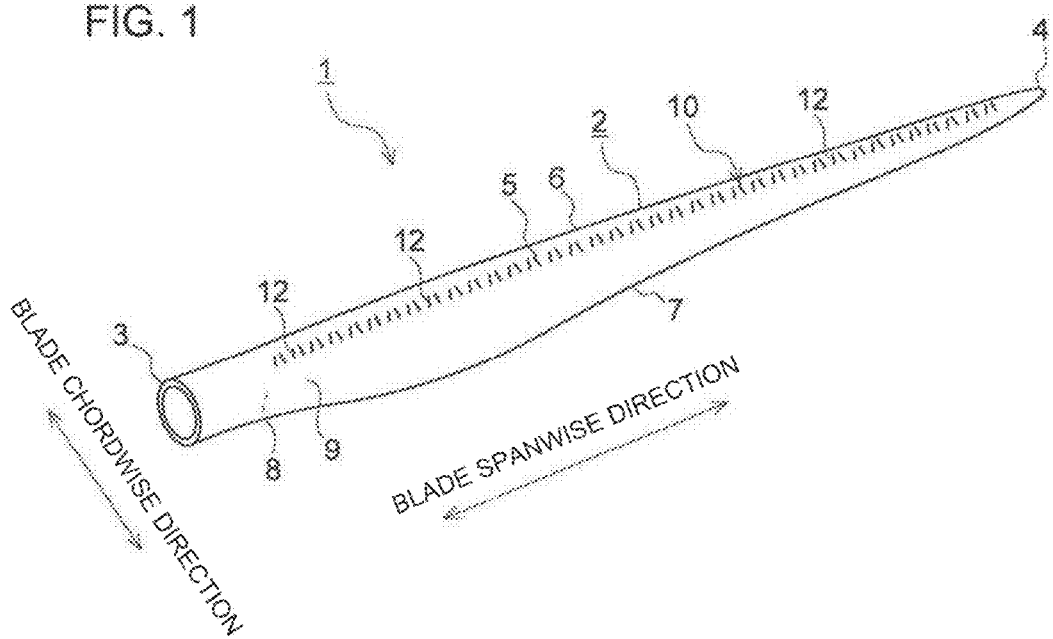
FIG. 1 is a perspective view of a wind turbine blade having a vortex generator according to an embodiment.

Firstly, with reference to FIG. 1, the overall configuration of a wind turbine blade 1 according to some embodiments will be described. FIG. 1 is a perspective view of the wind turbine blade 1 having a vortex generator 10 according to an embodiment.

The wind turbine blade 1 according to some embodiments includes a blade body 2 and a vortex generator 10 mounted to a surface (blade surface) of the blade body 2.

The blade body 2 includes a blade root 3 to be attached to a hub of a wind turbine power generating apparatus, a blade tip 4 positioned farthest from the hub, and an airfoil part 5 extending between the blade root 3 and the blade tip 4. The wind turbine blade 1 has a leading edge 6 and a trailing edge 7 from the blade root 3 to the blade tip 4. Further, an exterior shape of the wind turbine blade 1 is formed by a pressure surface 8 and a suction surface 9 disposed opposite to the pressure surface 8.

Hereinafter, "blade spanwise direction" refers to a direction oriented from the blade root 3 toward the blade tip 4, and "blade chordwise-direction" refers to a direction along a line (chord) connecting the leading edge 6 and the trailing edge 7 of the blade body 2.

In an embodiment, the wind turbine power generating apparatus having the above wind turbine blade 1 includes a plurality of wind turbine blades 1 mounted to a hub in a radial fashion, so that a rotor (which includes the wind turbine blades 1 and the hub) rotates in response to wind received by the plurality of wind turbine blades 1, and a generator coupled to the rotor generates electric power.

Next, the vortex generator 10 according to some embodiments will be described in detail with reference to FIGS. 2 to 4D.

Figure 2:
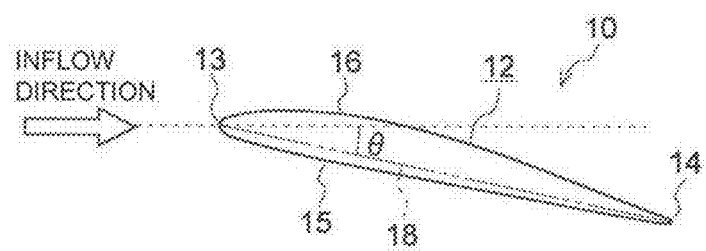
FIG. 2 is a diagram for describing positioning of a fin of a vortex generator according to an embodiment.
Figure 3:
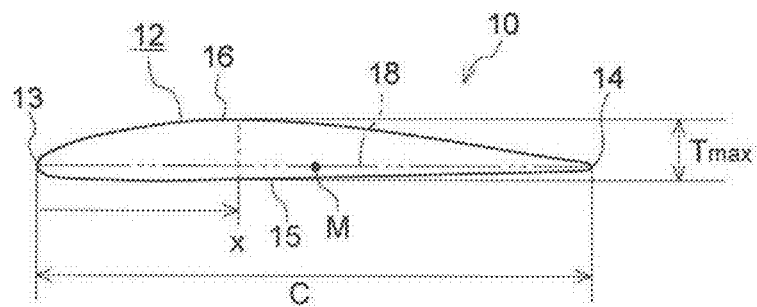
FIG. 3 is a diagram showing an airfoil for describing a shape of a fin of a vortex generator according to an embodiment.

FIG. 2 is a diagram showing an airfoil for describing positioning of a fin 12 of the vortex generator 10 according to an embodiment. FIG. 3 is a diagram showing an airfoil for describing a shape of the fin 12 of the vortex generator 10 according to an embodiment. FIGS. 4A to 4D are diagrams for describing a flow around the vortex generator 10 according to an embodiment. FIGS. 2 and 3 show an airfoil at a certain height-directional position of the fin 12.

As depicted in FIGS. 2 and 3 for an example, the vortex generator 10 according to some embodiments includes the fin 12 mounted to protrude from the surface of the wind turbine blade 1 (blade body 2).

The fin 12 is oriented so that a fin chord 18 of the fin 12 is oblique with respect to an in-flow direction of wind flowing toward the wind turbine blade 1 (see FIG. 2). For instance, the fin chord 18 is slanted so that a skew angle (angle of attack) θ is formed between the fin chord 18 and the in-flow direction of wind. The skew angle θ is greater than 0° and less than 90°.

A suction surface 16 of the fin is facing downstream with respect to the in-flow direction of wind and has a curved convex shape.

In a height range of at least a part of the fin 12, a maximum fin blade-thickness ratio tmax/C satisfies an expression of 0.10≤tmax/C≤0.12 (see FIG. 3), where the maximum fin blade-thickness ratio tmax/C is a ratio of a maximum fin blade-thickness tmax to a fin chord length C.

In the present specification, "in-flow direction of wind" refers to a direction of a flow along a surface of the wind turbine blade 1 (see FIG. 4A) at a mounting position of the vortex generator 10. As an "in-flow direction of wind", a blade-chordwise-direction (see FIG. 1) of the wind turbine blade 1 at a mounting position of the vortex generator 10 may be used approximately.

In an embodiment illustrated in FIGS. 2 and 3, the fin 12 has an airfoil shape. The fin 12 includes a leading edge 13 disposed on an upstream side with respect to the in-flow direction of wind, a trailing edge 14 disposed on a downstream side with respect to the in-flow direction of wind, a pressure surface 15 of the fin 12 facing toward upstream with respect to the in-flow direction of wind, and the suction surface 16 of the fin 12 facing toward downstream with respect to the in-flow direction of wind. In this fin 12, a line connecting the leading edge 13 and the trailing edge 14 is the fin chord 18. As depicted in FIG. 3, the fin chord length C of the fin chord 18 is a length along the chord 18 from the leading edge 13 to the trailing edge 14. Further, the maximum distance between the pressure surface 15 and the suction surface 16 in a direction orthogonal to the chord is the maximum fin blade thickness tmax.

Now, with reference to FIGS. 4A to 4D, a function of the vortex generator 10 will be described.

Figure 4A:
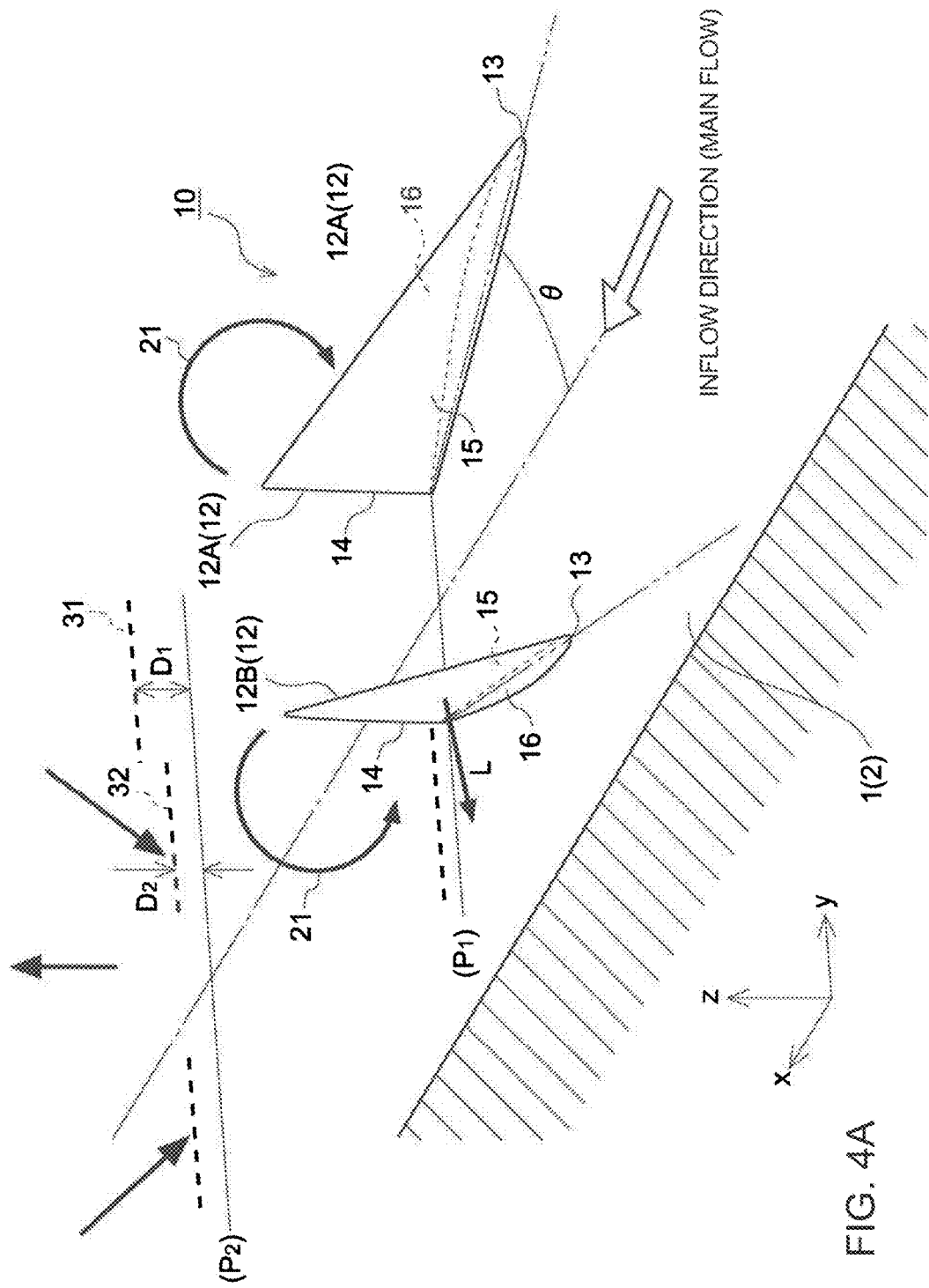
FIG. 4A is a perspective view for describing a flow around a vortex generator according to an embodiment.
Figure 4C:
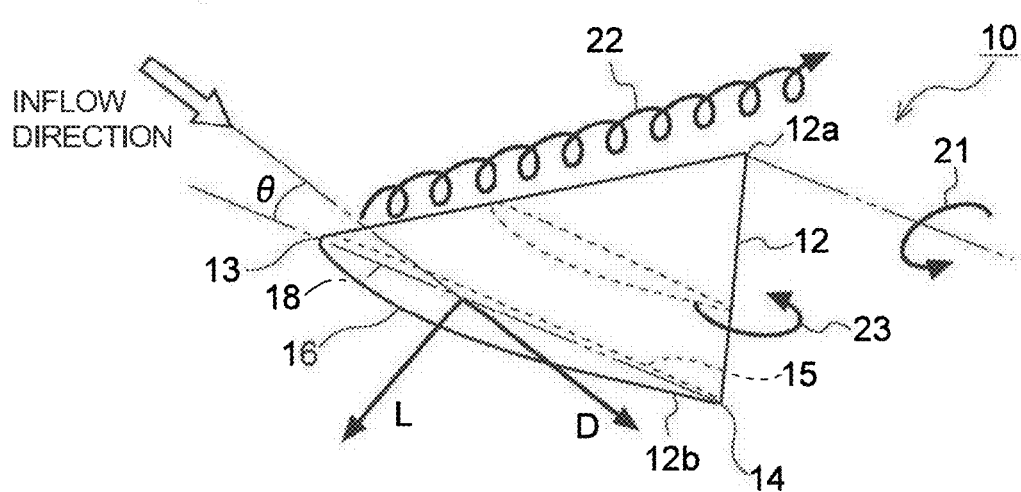
FIG. 4C is a perspective view for describing a flow around a fin of a vortex generator according to an embodiment.
Figure 4D:
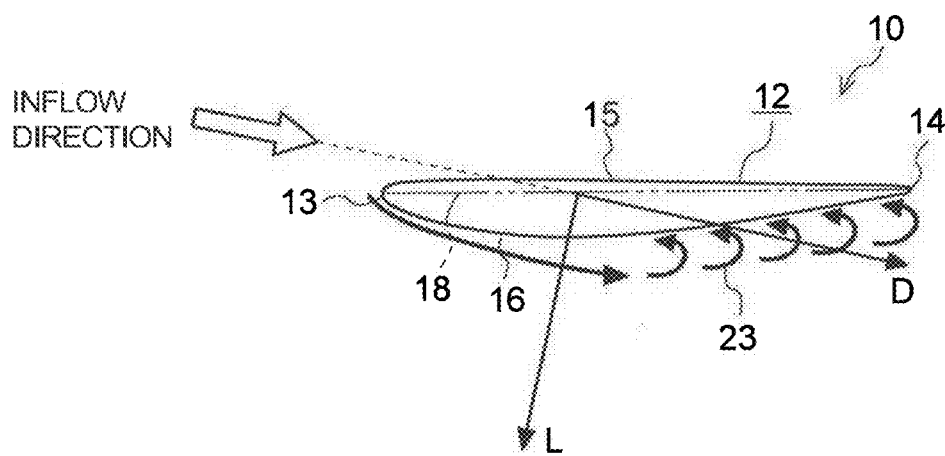
FIG. 4D is a cross-sectional view for describing a flow around a fin of a vortex generator according to an embodiment.

FIG. 4A is a perspective view for describing a flow around the vortex generator 10 according to an embodiment. FIG. 4B is a velocity distribution diagram showing a result of fluid analysis around the vortex generator 10 according to an embodiment. FIG. 4C is a perspective view for describing a flow around the fin 12 of the vortex generator 10 according to an embodiment. FIG. 4D is a cross-sectional view for describing a flow around the fin 12 of the vortex generator 10 according to an embodiment.

FIG. 4B shows a velocity distribution 28 in a cross section at a position $P_1$ of the trailing edge 14 of the fin 12, which is a cross section orthogonal to the in-flow direction of wind, and a velocity distribution 29 in a cross section at a position $P_2$ on a downstream side of the fin 12, which is also a cross section orthogonal to the in-flow direction of wind. In the velocity distributions 28, 29, regions with a higher fluid velocity are shown in darker shading, and regions with a lower fluid velocity are shown in less dark shading. FIG. 4D is a cross-sectional view in a direction orthogonal to the height direction of the fin 12.

As depicted in FIGS. 4A to 4D, the vortex generator 10 normally generates a longitudinal vortex 21 on the side of the suction surface 16 of the fin 12 with a lift L produced by the fin 12. Further, a flow flowing into the fin 12 generates a longitudinal vortex 22 along an edge (the second edge 122 in FIG. 6) extending from the upstream-most position of the leading edge 13 of the fin 12 toward the top portion 12a. The vertical vortices 21, 22 promote momentum exchange between outside and inside of a boundary layer 31 at a downstream side of the vortex generator 10. Specifically, the boundary layer 31 farther from the fin 12 receives less influence from the vortex generator 10 and thus has a thickness $D_1$ which is relatively large. In contrast, at a position closer to the fin 12, the vortices 21, 22 generated by the vortex generator 10 promote momentum exchange in the height direction of the fin 12, and thus the boundary layer 32 has a thickness $D_2$ smaller than the thickness $D_1$ of the boundary layer 31. Accordingly, the vortex generator 10 reduces the boundary layer 31 on the surface of the wind turbine blade 1, thereby suppressing separation at the trailing edge of the wind turbine blade 1.

However, depending on the shape of the fin 12 of the vortex generator 10, separation at the suction surface 16 of the fin 12 may bring about generation of a streamwise vortex 23 (see FIGS. 4C and 4D). The streamwise vortex 23 may cause an increase of a drag D (see FIG. 4C) of the fin 12. Accordingly, the shape of the fin of the vortex generator 10 should be designed taking account of not only the effect to suppress separation at the trailing edge of the wind turbine blade 1 but also the demerit (drag penalty) of an increase of a drag due to provision of the vortex generator 10.

It should be noted that the vertical vortices 21, 22 refer to vortices formed in the height direction of the fin 12. Further, the streamwise vortex 23 refers to a vortex formed in a plane orthogonal to the height direction of the fin 12.

In this regard, the embodiment depicted in the above described FIGS. 2 and 3 is based on a result of numerical calculation conducted by the present inventors to study an influence of a fin shape of the vortex generator 10 on a lift coefficient and a lift-drag ratio of the fin 12, and the fin 12 of the vortex generator 10 has an airfoil such that the maximum fin blade-thickness ratio tmax/C satisfies an expression of 0.10≤tmax/C≤0.12, in the height range of at least a part of the fin 12.

While a typical environment of usage of the vortex generator 10 for a wind turbine is viscosity-dominated (approximately, Re=$10^3$ to $10^4$), with the maximum fin blade-thickness ratio tmax/C set to be from 0.10 to 0.12, it is possible to suppress generation of the streamwise vortex 23 (see FIGS. 4C and 4D) due to separation at the suction surface 16 of the fin 12, and to improve a lift coefficient and a lift-drag ratio of the fin 12.

More specifically, if the maximum fin blade-thickness ratio tmax/C is larger than 0.12, a lift of the fin 12 may be maintained but a drag starts to increase, which leads to a decrease in a lift-drag ratio of the fin 12. On the other hand, if the maximum fin blade-thickness ratio tmax/C is smaller than 0.10, separation may be generated from the vicinity of the leading edge 13 of the fin 12, which leads to a failure in maintaining a lift. Accordingly, a lift-drag ratio of the fin 12 decreases. Therefore, with the maximum fin blade-thickness ratio tmax/C set to be from 0.10 to 0.12, it is possible to improve a lift coefficient and a lift-drag ratio of the fin 12.

Figure 5:
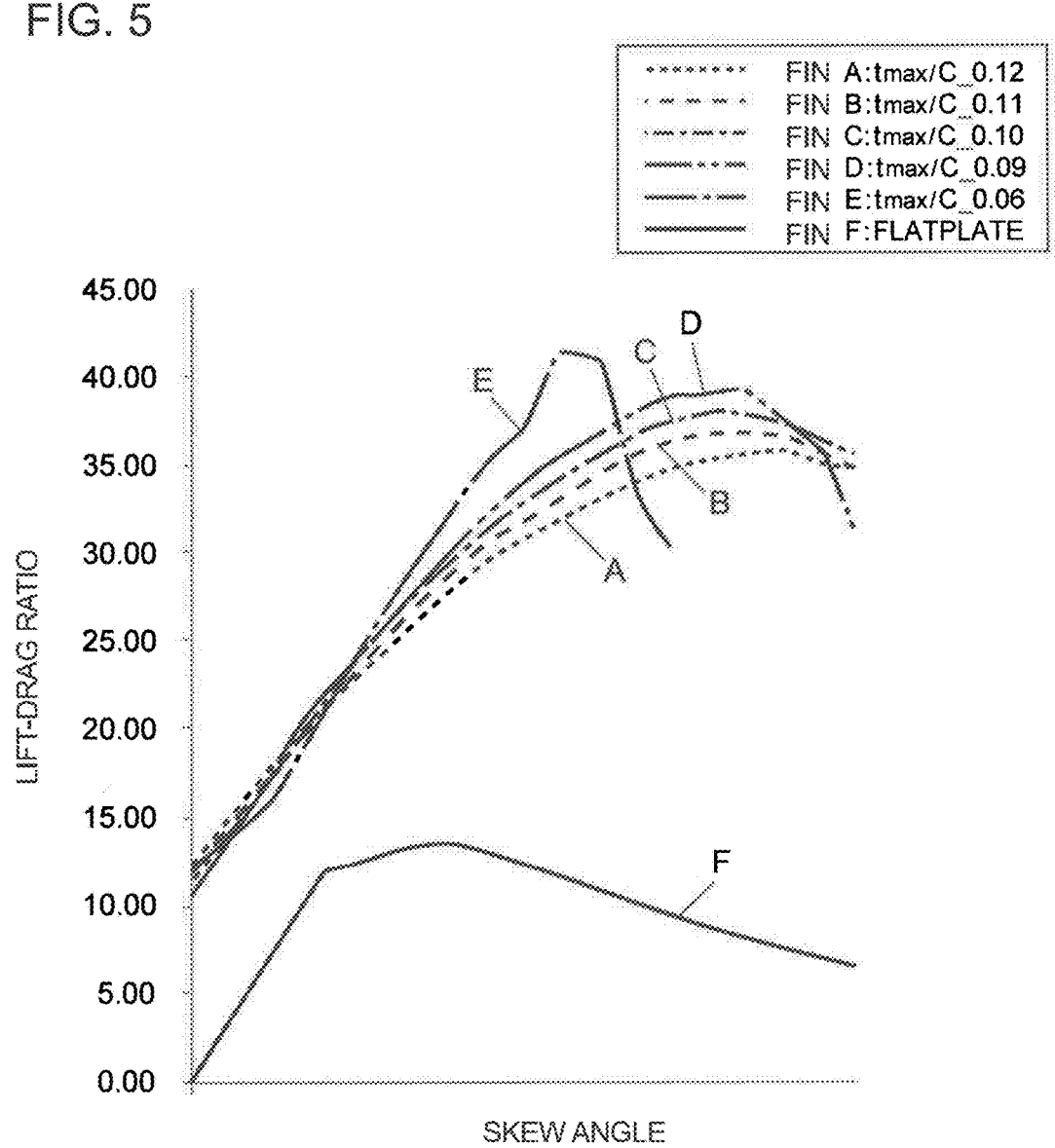
FIG. 5 is a graph showing an example of lift-drag ratios for different maximum fin blade-thickness ratios.

FIG. 5 is a graph showing lift-drag ratios for different maximum fin blade-thickness ratios. This graph shows an expression between a skew angle and a lift-drag ratio for each of a plurality of fins A to F varied in shape.

The fins A to E have an airfoil shape. The fin A has a tmax/C (maximum fin blade-thickness ratio) of 0.12, the fin B has a tmax/C of 0.11, the fin C has a tmax/C of 0.10, the fin D has a tmax/C of 0.09, and the fin E has a tmax/C of 0.06. The fin F has a shape not of an airfoil but of a flat plate. In this graph, the lift-drag ratios correspond to when the following expression is satisfied: Re=$5\times10^4$.

According to this graph, for the fin A having a tmax/C (maximum fin blade-thickness ratio) of 0.12, the fin B having a tmax/C of 0.11, and the fin C having a tmax/C of 0.10, the lift-drag ratios are good in a wide range of the skew angle. In contrast, for the fin D having a tmax/C of 0.09 and the fin E having a tmax/C of 0.06, the lift-drag ratios rapidly decrease when a skew angle exceeds a certain value. As a result of analysis conducted by the present inventors, including fluid analysis, it was found that separation takes place in a region close to the leading edge 13 of the fin 12 and a lift-drag ratio decreases, if the maximum fin blade-thickness ratio is less than 0.10, as in the fin D and the fin E. In other words, with reference to FIG. 4D, if the maximum fin blade-thickness ratio is less than 0.10, separation takes place starting from a region close to the leading edge 13 of the fin 12, and accordingly the streamwise vortex 23 is generated closer to the leading edge 13, which leads to an increase in the drag D and a decrease in the lift-drag ratio of the fin 12.

Accordingly, as described above, with the maximum fin blade-thickness ratio tmax/C set to be 0.10 or more, it is possible to improve the lift-drag ratio of the fin 12.

As describe above, according to the above embodiment, by setting the maximum fin blade-thickness ratio of the fin 12 of the vortex generator 10 within the above range, it is possible to reduce drag penalty due to provision of the vortex generator 10 while suppressing separation of a flow along a surface of the wind turbine blade 1.

Herein, the Reynolds number $Re_{vg}$ of the fin 12 is defined by the following expression (1):

$$Re_{vg} = \frac{\rho U_{vg} C_{vg}}{\mu} \quad (1)$$

where $\rho$ is a fluid density, $U_{vg}$ is a fluid velocity (velocity of a main stream), $C_{vg}$ is a fin chord length, and $\mu$ is a viscosity coefficient of fluid.

Meanwhile, although the Reynolds number of the wind turbine blade 1 (see FIG. 1) is defined similarly to the above expression (1), the fin chord length $C_{vg}$ of the fin 12 is extremely small compared to the blade chord length of the wind turbine blade 1, and thus the Reynolds number of the wind turbine blade 1 is quite different from the Reynolds number $Re_{vg}$ of the fin 12. Thus, even if an airfoil is optimum for the wind turbine blade 1, it is difficult to achieve the full function of the fin 12 by applying the same airfoil to the fin 12. Thus, with the fin 12 of the vortex generator 10 having an airfoil uniquely designed for the fin 12 as described above, it is possible to achieve excellent lift coefficient and lift-drag ratio for the fin 12.

With reference to FIG. 3, in some embodiments, the maximum fin blade-thickness ratio tmax/C satisfies an expression of $0.10 \leq tmax/C \leq 0.11$, in a height range of at least a part of the fin 12.

According to this embodiment, it is possible to achieve excellent lift coefficient and lift-drag ratio for the fin 12, and to balance suppression of separation at the trailing edge of the wind turbine blade 1 (see FIG. 1) and reduction of drag penalty effectively.

Figure 6:
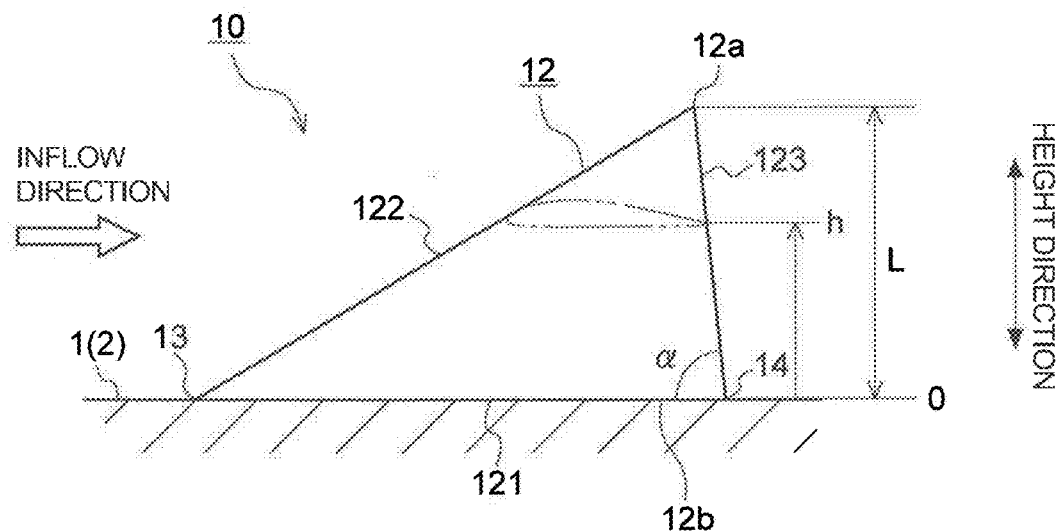
FIG. 6 is a side view of a fin of a vortex generator according to an embodiment.

FIG. 6 is a side view of the fin 12 of the vortex generator 10 according to an embodiment.

As shown in FIG. 6 as an example, in some embodiments, the maximum fin blade-thickness ratio tmax/C of the fin 12 satisfies an expression of $0.10 \leq tmax/C \leq 0.12$ in a height range represented by an expression of $0.5L \leq h \leq 0.85L$, where L is the entire fin length of the fin 12 from a root 12b to the top portion 12a.

In an embodiment, the maximum fin blade-thickness ratio tmax/C satisfies an expression of $0.10 \leq tmax/C \leq 0.12$ in a height range represented by an expression of $0.2L \leq h \leq 0.85L$.

Figure 10:
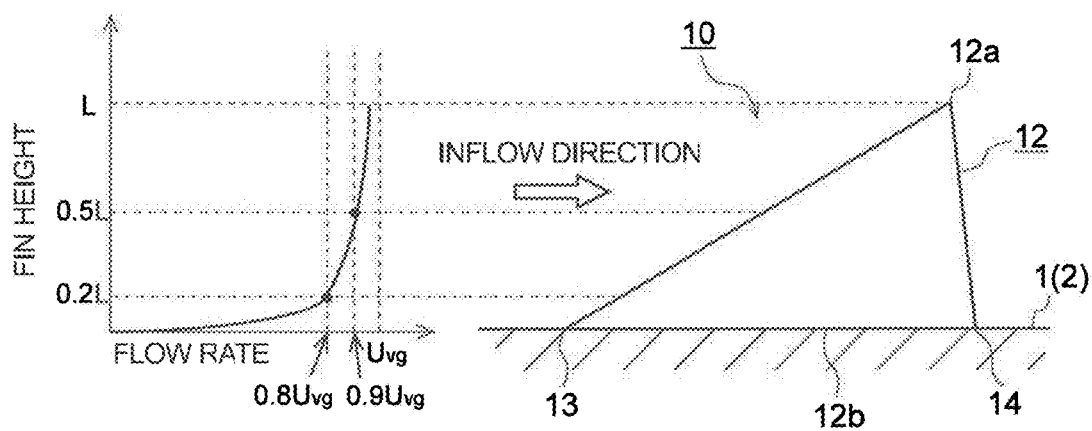
FIG. 10 is a diagram showing a velocity distribution with respect to a height direction of a fin of a vortex generator according to an embodiment.

FIG. 10 is a diagram showing a velocity distribution with respect to a height direction of the fin 12 of the vortex generator 10 according to an embodiment.

As shown in FIG. 10, with regard to the fin 12 of the vortex generator 10, assuming that a fin height h is zero at the root 12b of the fin 12, a fluid velocity at a fin height h of 0.5L corresponds to approximately 90% of the flow velocity $U_{vg}$ of a main stream (e.g. a flow of wind at an upstream side of the fin 12 as shown in FIG. 4A), and aerodynamic performance of the entire fin is greatly affected by a fin shape in a range of the fin height h from 0.5L toward the top portion 12a of the fin 12 (a range represented by an expression of $0.5L \leq h$). It should be noted that, however, in a region in the vicinity of the top portion 12a of the fin 12 (a region represented by an expression of h>0.85L), importance of aerodynamic property is relatively small due to an influence of vortices (the vertical vortices 21 in FIGS. 4A and 4C) generated at the top portion 12a of the fin 12. Further, from a structural point of view, in the above region in the vicinity of the top portion 12a of the fin 12, the maximum fin blade-thickness ratio tmax/C is desired to be greater to ensure a certain dimension of the maximum fin blade thickness tmax. Thus, as described above, with the maximum fin blade-thickness ratio tmax/C set within the above numerical range (tmax/C satisfies an expression of $0.10 \leq tmax/C \leq 0.12$, or $0.10 \leq tmax/C \leq 0.11$), in a height range of from 0.5L to 0.85L, it is possible to improve aerodynamic performance of the fin 12 effectively while ensuring the strength of the fin 12.

With reference to FIG. 3, in some embodiments, the fin 12 has a blade thickness that reaches the maximum fin blade thickness tmax at a chordwise-directional position closer to the leading edge 13 than the middle point M of the fin chord 18 is.

In this case, the fin 12 may have a blade thickness that reaches the maximum fin blade-thickness tmax at a chordwise-directional position x which satisfies an expression of $0.3C \leq x \leq 0.4C$.

Alternatively, the fin 12 may have a blade thickness that reaches the maximum fin blade-thickness tmax at a chordwise-directional position x which satisfies an expression of $0.31C \leq x \leq 0.35C$.

According to this embodiment, it is possible to achieve excellent lift coefficient and lift-drag ratio for the fin 12, and to balance suppression of separation at the trailing edge of the wind turbine blade 1 (see FIG. 1) and reduction of drag penalty effectively.

Next, a side-view shape of the fin 12 of the vortex generator 10 will be described with reference to FIGS. 6 to 8.

FIG. 6 is a side view of the fin 12 of the vortex generator 10 according to an embodiment. FIG. 7 is a side view of the fin 12 of the vortex generator 10 according to another embodiment. FIG. 8 is a side view of the fin 12 of the vortex generator 10 according to yet another embodiment.

Figure 7:
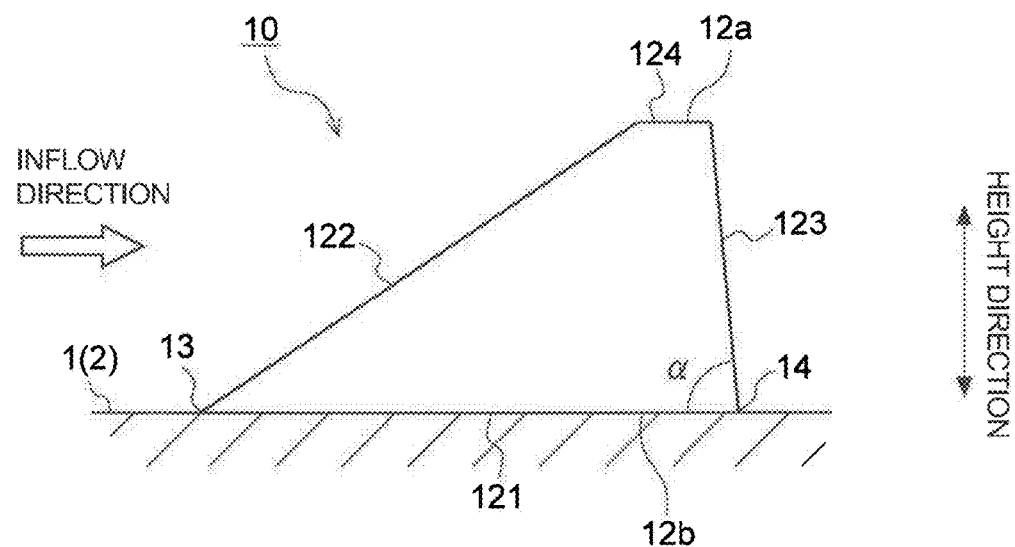
FIG. 7 is a side view of a fin of a vortex generator according to another embodiment.
Figure 8:
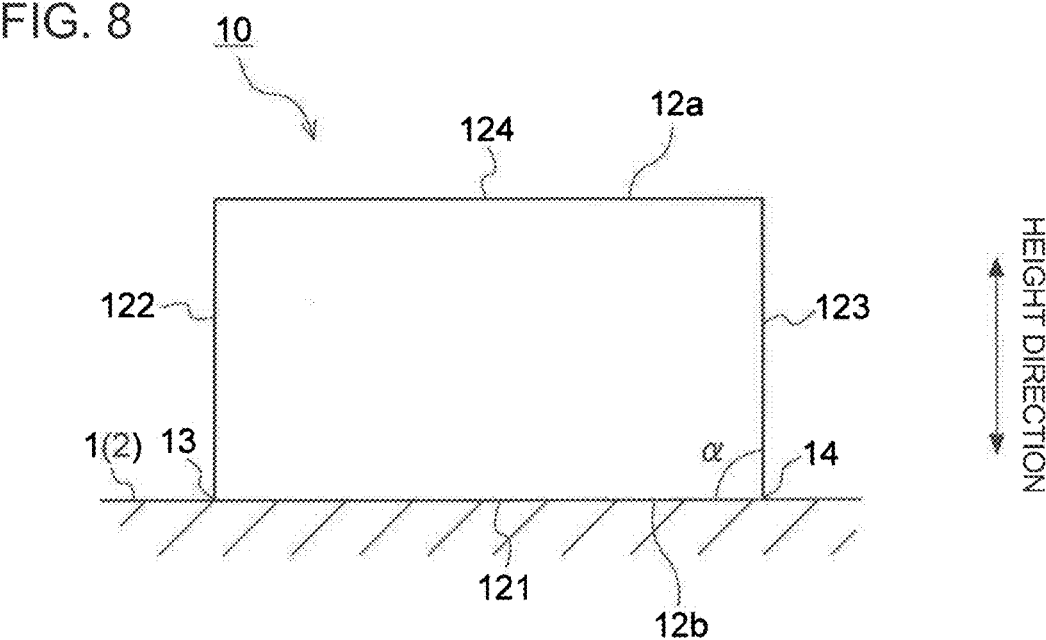
FIG. 8 is a side view of a fin of a vortex generator according to yet another embodiment.

In some embodiments depicted in FIGS. 6 to 8, the fin 12 has, in a side view, the first edge 121 forming a connecting part at which the fin 12 connects to the surface of the wind turbine blade 1, the second edge 122 intersecting with the first edge 121 and being disposed on an upstream side with respect to the in-flow direction of wind to form an upstream end portion of the fin 12, and the third edge 123 intersecting with the first edge 121 and being disposed on a downstream side with respect to the in-flow direction of wind to form a downstream end portion of the fin 12.

It should be noted that the fin 12 may have any polygonal shape in a side view, including a triangle (see FIG. 6) formed by the first edge 121, the second edge 122, and the third edge 123, which have a linear shape, and a quadrilateral (see FIG. 7 or 8) having the fourth edge 124, which has a linear shape, connecting the second edge 122 and the third edge 123, besides the second edge 122 and the third edge 123, which have a linear shape. Alternatively, though not illustrated, a part of edges constituting a side-view shape of the fin 12, which are three or more edges including the first edge 121, the second edge 122 and the third edge 123, may have a curve shape instead of a linear shape.

In some embodiments depicted in FIGS. 6 and 8 as an example, the second edge 122 may be oblique with respect to the fin height direction so as to get closer to the downstream side toward the top portion 12a of the fin 12.

In this case, the second edge 122 may be longer than the third edge 123.

According to the above embodiment, with the second edge 122 (an edge forming the leading edge 13 of the fin 12) disposed oblique to the fin height direction so as to get closer to the downstream side toward the top portion 12a of the fin 12, it is possible to generate the vortex 21 for promoting momentum exchange between inside and outside of the boundary layer 31 (see FIG. 4A) at the downstream side of the fin.

In some embodiments depicted in FIGS. 7 and 8 as an example, the fin 12 further includes the fourth edge 124 of a linear shape or a curve shape forming a distal end, in the height direction, of the fin 12 in a side view.

In the embodiment depicted in FIG. 7, the second edge 122 of the fin 12 is oblique with respect to the fin height direction so as to get closer to the downstream side toward the top portion 12a of the fin 12, and the fin 12 further includes the fourth edge 124 of a linear shape forming a distal end, in the height direction, of the fin 12 in a side view.

In the embodiment depicted in FIG. 8, the second edge 122 and the third edge of the fin 12 are disposed substantially parallel to each other, and the first edge 121 and the fourth edge 124 of the fin 12 are disposed substantially parallel to each other, and thereby the fin 12 has a substantially rectangular shape in a side view. In this case, the fin 12 can be produced readily.

As described above, a region in the vicinity of the top portion 12a of the fin 12 has a relatively small importance with regard to aerodynamic property due to an influence of a vortex (the longitudinal vortex 21 in FIGS. 4A and 4C) generated at the top portion 12a of the fin 12. Thus, according to the above embodiment, the top portion 12a of the fin 12, which has less influence on aerodynamic performance of the entire fin, is cut off to form the fourth edge 124, and thereby it is possible to enhance safety of workers who handle the vortex generator and to reduce induced drag that may be generated at the fin.

With reference to FIGS. 6 to 8, in some embodiments, the first edge 121 and the third edge 123 form an angle α of at most 90 degrees.

According to the above embodiment, after the fin 12 having an airfoil shape is molded, the fin 12 can be readily removed out of a mold by moving the fin 12 relative to the mold in a direction oriented from the top portion 12a of the fin 12 toward the root 12b.

As depicted in FIGS. 6 and 7 as an example, in some embodiments, the fin chord 18 of the fin 12 has a length that decreases from the root 12b of the fin 12 toward the top portion 12a of the fin 12.

According to this embodiment, it is possible to reduce an area of the fin 12 in a side view to reduce a drag generated at the fin 12.

Figure 9:
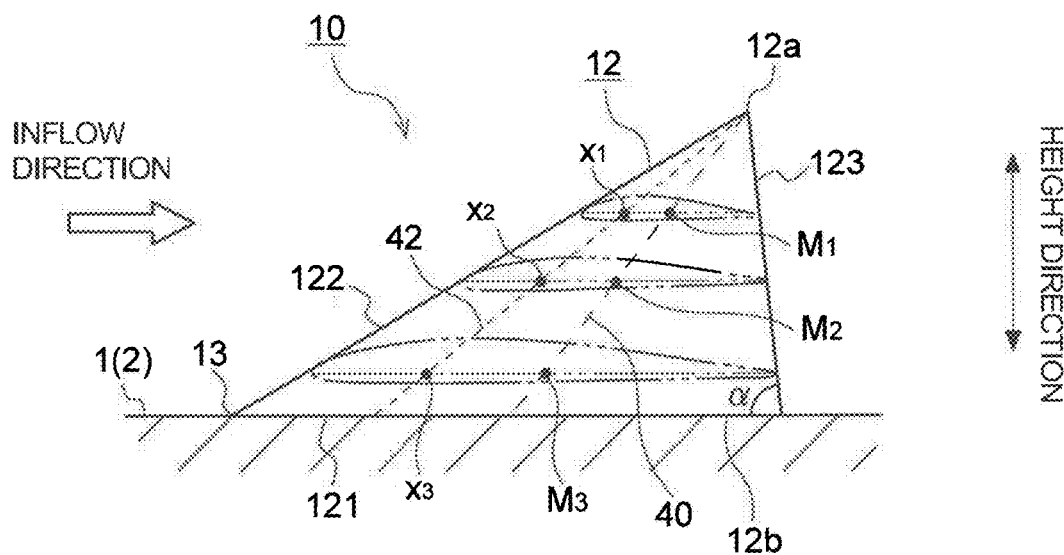
FIG. 9 is a side view of a fin of a vortex generator according to an embodiment, also showing an airfoil at each height-directional position.

FIG. 9 is a side view of the fin 12 of the vortex generator 10 according to an embodiment, also showing an airfoil at each height-directional position.

As depicted in FIG. 9, in some embodiments, the fin 12 is oblique with respect to the height direction of the fin 12 so that a line 42 connecting positions $x_1, x_2, x_3, \ldots$, at which the blade thickness of the fin 12 is the maximum fin blade thickness tmax, is oriented toward the same side to which a reference line 40 connecting the middle points $M_1, M_2, M_3$, ... of the fin chord length C is oriented, in a height range of at least a part of the fin 12. In other words, the line 42 connecting the positions $x_1, x_2, x_3, \ldots$, at which the blade thickness of the fin 12 is the maximum fin blade thickness tmax, is oblique so as to extend toward the downstream side as the height of the fin 12 increases.

According to the above embodiment, even if the second edge 122 or the third edge 123 is oblique with respect to the fin height direction, it is possible to achieve an airfoil that improves a lift coefficient and a lift-drag ratio of the fin 12 in a broad range in the fin height direction. Thus, it is possible to reduce drag penalty due to provision of the vortex generator 10 while suppressing separation of a flow along a surface of the wind turbine blade 1.

In the embodiment depicted in FIG. 9, the line 42 connecting the positions $x_1, x_2, x_3, \ldots$, at which the blade thickness of the fin 12 is the maximum fin blade thickness tmax, is oblique with respect to the height direction of the fin 12, and thus it may be difficult to remove the fin 12 out of a mold after molding the fin 12. In this case, an angle α formed between the first edge 121 and the third edge 123 may be set to 90 degrees or less, as described above. Accordingly, it is possible to remove the fin 12 out of a mold readily after molding while achieving an airfoil that improves a lift coefficient and a lift-drag ratio of the fin 12.

Referring again to FIG. 1, the vortex generator 10 according to some embodiments is disposed within a turbulent flow region of a wind flow along the suction surface 9, on the suction surface 9 of the wind turbine blade 1.

Separation of a flow on the suction surface 9 of the wind turbine blade 1 takes place due to a boundary layer becoming gradually thicker from a streamline flow region in the vicinity of the leading edge 6 toward a turbulent flow region downstream thereof, and the flow being separated before arriving at the trailing edge 7.

In this regard, according to the above embodiment, the vortex generator 10 is disposed within a turbulent flow region of a wind flow along the suction surface 9, and thereby it is possible to suppress separation of a flow from the suction surface 9.

In an embodiment, the vortex generator 10 includes a plurality of fins 12 arranged in a linear pattern in the blade spanwise direction of the wind turbine blade 1. For instance, as depicted in FIG. 4A, a plurality of pairs of fins 12A, 12B disposed symmetric with respect to a plane passing through the in-flow direction of wind may be disposed in the blade spanwise direction of the wind turbine blade 1.

Further, the vortex generator 10 may be mounted to the surface of the wind turbine blade 1 (blade body 2) via a platform portion. For instance, a plurality of fins 12 may be fixed to a platform portion (not depicted), and the platform portion with the fins 12 fixed thereto of the vortex generator 10 may be mounted to the surface of the wind turbine blade 1 (blade body 2).

The plurality of fins 12 may be mounted to the side of the blade root 3 of the wind turbine blade 1 (see FIG. 1). At the side of the blade root 3 of the wind turbine blade 1, it is desirable to improve the maximum lift coefficient to make up for shortage of an actual blade chord length with respect to the optimum blade chord length. For this purpose, an effective approach is to mount the vortex generator 10 to a region in the vicinity of a position of the maximum blade chord length to suppress separation of a flow along the surface of the wind turbine blade 1.

Further, as in the above embodiment, the vortex generator 10 has a novel fin airfoil that can achieve a high lift-drag ratio in a height range of at least a part of the fin 12, and thus a region on the side of the blade tip 4 of the wind turbine blade 1 with a high tip speed can particularly benefit from the aerodynamic merit of the vortex generator 10. Thus, the vortex generator 10 may be disposed in a region on the side of the blade tip 4 of the wind turbine blade 1 with a high tip speed (see FIG. 1). Herein, a region on the side of the blade tip 4 is, for instance, a range represented by an expression of $0.6 \leq r/R \leq 0.95$, where r is a position along a radial direction of a wind turbine rotor, which is referred to simply as a radial-directional position hereinafter, and R is a radial-directional position of the blade tip 4. Herein, the origin of the positions is the rotational center of the wind turbine rotor.

In the embodiment depicted in FIG. 1 for an example, the vortex generators 10 are disposed in a substantial part of a blade-longitudinal range of the wind turbine blade 1 from the blade root 3 to the blade tip 4.

With reference to FIG. 1, the wind turbine blade 1 according to some embodiments includes the blade body 2 and the vortex generator 10 mounted to the surface of the blade body 2. The vortex generator 10 has a configuration of any one of the above embodiments.

According this embodiment, as described above, the fin 12 of the vortex generator 10 has an airfoil such that the maximum fin blade-thickness ratio tmax/C satisfies an expression of $0.10 \leq tmax/C \leq 0.12$ in a height range of at least a part of the fin 12, and thereby it is possible to reduce drag penalty due to provision of the vortex generator 10 while suppressing separation of a flow along the surface of the wind turbine blade 1.

A wind turbine power generating apparatus (not depicted) according to some embodiments includes the above wind turbine blade 1 (see FIG. 1).

According to this embodiment, the wind turbine power generating apparatus is equipped with the wind turbine blade 1, and thereby it is possible to reduce drag penalty due to provision of the vortex generator 10 while suppressing separation of a flow along a surface of the wind turbine blade 1.

As described above, according to at least some embodiments of the present invention, it is possible to reduce drag penalty due to provision of the vortex generator 10 while suppressing separation of a flow along a surface of the wind turbine blade 1.

Embodiments of the present invention were described in detail above, but the present invention is not limited thereto, and various amendments and modifications may be implemented.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A vortex generator for a wind turbine blade, comprising a fin protruding from a surface of the wind turbine blade, being oriented so that a fin chord of the fin is oblique to an in-flow direction of wind which flows toward the wind turbine blade, having a suction surface which faces toward downstream with respect to the in-flow direction of the wind and which has a curved convex shape, and having a maximum fin blade-thickness ratio tmax/C which satisfies an expression of $0.10 \leq tmax/C \leq 0.12$ in a height range of the fin represented by an expression of $0.5L \leq h \leq 0.85L$, where the maximum fin blade-thickness ratio tmax/C is a ratio of a maximum fin blade thickness tmax to a fin chord length C, and L is a fin entire length from a root to a top portion of the fin.

2. The vortex generator for a wind turbine blade according to claim 1,
wherein the maximum fin blade-thickness ratio tmax/C satisfies an expression of $0.10 \leq tmax/C \leq 0.11$ in a height range of at least a part of the fin.

3. The vortex generator for a wind turbine blade according to claim 1,
wherein the fin has a thickness which reaches the maximum fin blade thickness tmax at a chordwise-directional position x, the chordwise-directional position x satisfying an expression of $0 < x < 0.5C$.

4. The vortex generator for a wind turbine blade according to claim 3,
wherein the chordwise-directional position x at which the blade thickness of the fin reaches the maximum fin blade thickness tmax satisfies an expression of $0.3C \leq x \leq 0.4C$.

5. The vortex generator for a wind turbine blade according to claim 4,
wherein the chordwise-directional position x at which the blade thickness of the fin reaches the maximum fin blade thickness tmax satisfies an expression of $0.31C \leq x \leq 0.35C$.

6. The vortex generator for a wind turbine blade according to claim 1,
wherein the fin includes, in a side view, a first edge forming a connection part at which the fin connects to the surface of the wind turbine blade, a second edge intersecting with the first edge and being disposed on an upstream side with respect to the in-flow direction of the wind to form an upstream end portion of the fin, and a third edge intersecting with the first edge and being disposed on a downstream side with respect to the in-flow direction of the wind to form a downstream end portion of the fin.

7. The vortex generator for a wind turbine blade according to claim 6,
wherein the second edge of the fin is oblique to a fin height direction so as to get closer to the downstream side toward the top portion of the fin.

8. The vortex generator for a wind turbine blade according to claim 6,
wherein the fin further includes a fourth edge having a linear shape or a curve shape and forming a distal end of the fin with respect to a fin height direction, in the side view.

9. The vortex generator for a wind turbine blade according to claim 1,
wherein the first edge and the third edge form an angle of 90 degrees or less.

10. The vortex generator for a wind turbine blade according to claim 1, wherein the fin chord of the fin has a length which decreases from the root to the top portion of the fin.

11. The vortex generator for a wind turbine blade according to claim 1,
wherein the fin has a shape such that a line connecting positions at which the thickness of the fin reaches the maximum fin blade thickness tmax is oblique to a fin height direction so as to extend toward a same side as that of a reference line connecting middle points of the fin chord length, in a height range of at least a part of the fin.

12. The vortex generator for a wind turbine blade according to claim 1,
wherein the vortex generator is configured to be disposed on a suction surface of the wind turbine blade and within a turbulent flow region of a wind flow along the suction surface.

13. A wind turbine blade, comprising:
a blade body; and
the vortex generator according to claim 1 mounted to a surface of the blade body.

14. A wind turbine power generating apparatus, comprising the wind turbine blade according to claim 13.

* * * * *